United States Patent
Yang et al.

(10) Patent No.: US 10,790,690 B2
(45) Date of Patent: Sep. 29, 2020

(54) METHOD AND APPARATUS FOR CONTROLLING CHARGING OF TERMINAL DEVICE

(71) Applicant: Xiaomi Inc., Beijing (CN)

(72) Inventors: Xiaoxing Yang, Beijing (CN); Hui Du, Beijing (CN); Linghua Gu, Beijing (CN)

(73) Assignee: Xiaomi Inc., Beijing (CN)

(*) Notice: Subject to any disclaimer, the term of this patent is extended or adjusted under 35 U.S.C. 154(b) by 664 days.

(21) Appl. No.: 14/993,529

(22) Filed: Jan. 12, 2016

(65) Prior Publication Data

US 2016/0211692 A1    Jul. 21, 2016

(30) Foreign Application Priority Data

Jan. 15, 2015 (CN) .......................... 2015 1 0020874

(51) Int. Cl.
*H02J 7/00* (2006.01)

(52) U.S. Cl.
CPC .............. *H02J 7/0091* (2013.01); *H02J 7/00* (2013.01); *H02J 7/0071* (2020.01); *H02J 7/00719* (2020.01); *H02J 7/007* (2013.01); *H02J 7/00036* (2020.01); *H02J 7/007192* (2020.01); *H02J 2207/40* (2020.01)

(58) Field of Classification Search
CPC ........ H02J 7/0091; H02J 7/0047; H02J 7/007; H02J 7/0073
USPC .................................. 320/107, 150, 134, 162
See application file for complete search history.

(56) References Cited

U.S. PATENT DOCUMENTS

| 5,414,339 | A | * | 5/1995 | Masaki | ................. | B60L 3/003 318/139 |
| 6,124,700 | A | * | 9/2000 | Nagai | ................. | H02J 7/0052 320/130 |
| 8,907,631 | B1 | | 12/2014 | Gurries et al. | | |
| 9,013,138 | B2 | | 4/2015 | Nomura | | |
| 9,912,181 | B2 | * | 3/2018 | Gurries | ................. | H02J 7/0073 |
| 2001/0038275 | A1 | | 11/2001 | Hanada | | |
| 2004/0263119 | A1 | * | 12/2004 | Meyer | ................. | H02J 7/0004 320/116 |

(Continued)

FOREIGN PATENT DOCUMENTS

| CN | 1893217 | 1/2007 |
| CN | 102130476 | 7/2011 |

(Continued)

OTHER PUBLICATIONS

Office Action in counterpart Russian Application No. 2015156686/08(087341), dated Apr. 14, 2017.

(Continued)

*Primary Examiner* — David V Henze-Gongola
*Assistant Examiner* — Tarikh Kanem Rankine
(74) *Attorney, Agent, or Firm* — Finnegan, Henderson, Farabow, Garrett & Dunner, L.L.P.

(57) ABSTRACT

A method for controlling charging of a terminal device includes determining whether there is a need to switch from a first charging chip currently charging a battery of the terminal device to a second charging chip waiting to charge the battery, and controlling the first charging chip to stop charging the battery and starting the second charging chip to charge the battery if it is determined that there is the need to switch.

3 Claims, 4 Drawing Sheets

(56) References Cited

U.S. PATENT DOCUMENTS

| | | | | |
|---|---|---|---|---|
| 2008/0075494 | A1* | 3/2008 | Matsuo | G03G 15/5004 399/70 |
| 2010/0106631 | A1* | 4/2010 | Kurayama | B60L 11/1816 705/34 |
| 2011/0133701 | A1* | 6/2011 | Li | H02J 7/0091 320/153 |
| 2011/0304298 | A1 | 12/2011 | Gow et al. | |
| 2012/0326655 | A1 | 12/2012 | Nomura | |
| 2013/0310112 | A1* | 11/2013 | You | H04W 52/0267 455/566 |
| 2013/0334883 | A1* | 12/2013 | Kim | H02J 7/34 307/29 |
| 2014/0320083 | A1* | 10/2014 | Masuda | H01M 10/44 320/109 |
| 2014/0347003 | A1* | 11/2014 | Sporck | H02J 7/0052 320/107 |
| 2014/0347017 | A1* | 11/2014 | Sugano | B60L 1/003 320/137 |
| 2015/0002970 | A1* | 1/2015 | Kang | H02H 9/045 361/86 |
| 2015/0137741 | A1* | 5/2015 | Gurries | H02J 7/0073 320/107 |

FOREIGN PATENT DOCUMENTS

| | | |
|---|---|---|
| CN | 102290837 | 12/2011 |
| CN | 103166202 | 6/2013 |
| CN | 103682493 A | 3/2014 |
| CN | 203589812 U | 5/2014 |
| CN | 104410116 | 3/2015 |
| CN | 104505879 | 4/2015 |
| CN | 104578372 A | 4/2015 |
| JP | H01190225 A | 7/1989 |
| JP | H09056080 A | 2/1997 |
| JP | 3130311 B2 | 1/2001 |
| JP | 2008005645 A | 1/2008 |
| JP | 2008-131803 | 6/2008 |
| JP | 2013-5679 A | 1/2013 |
| RU | 2350004 C1 | 3/2009 |
| RU | 91481 U1 | 2/2010 |
| RU | 137160 U1 | 1/2014 |
| RU | 142225 U1 | 6/2014 |
| WO | WO 2011/143158 | 11/2011 |

OTHER PUBLICATIONS

International Search Report of PCT Application No. PCT/CN2015/093288, dated Jan. 29, 2016, issued by the State Intellectual Property Office of P.R. China as ISA (5 pages).

Extended European search report issued in European patent application No. 16151488.0, dated May 20, 2016 (7 pages).

English version of International Search Report of International Application No. PCT/CN2015/093288, dated Jan. 29, 2016 (2 pages).

* cited by examiner

METHOD AND APPARATUS FOR CONTROLLING CHARGING OF TERMINAL DEVICE

CROSS-REFERENCE TO RELATED APPLICATIONS

This application is based upon and claims priority to Chinese Patent Application No. 201510020874.8, filed Jan. 15, 2015, the entire contents of which are incorporated herein by reference.

TECHNICAL FIELD

The present disclosure relates to communication technology and, more particularly, to a method and apparatus for controlling charging of a terminal device.

BACKGROUND

For mobile devices, a shorter charging time is desired. In conventional technology, a mobile device is charged by using a charging chip. During the charging of the mobile device, the charging chip is always in a charging state, and thus heat will be generated during the entire charging process. If the mobile device needs to be fully charged at a relatively fast speed, charging current of the charging chip needs to be increased. However, increasing the charging current results in greater heat generated by the charging chip. In order to reduce the heat generated by the charging chip, the charging current of the charging chip needs to be reduced, which lengthens the charging time of the charging chip, thus reducing the charging efficiency.

SUMMARY

The embodiments of the present disclosure provide a method and an apparatus for controlling charging of a terminal device, so as to avoid generating an excessive amount of heat when charging the terminal device, and improving the charging efficiency of the terminal device at the same time.

In accordance with the present disclosure, there is provided a method for controlling charging of a terminal device. The method includes determining whether there is a need to switch from a first charging chip currently charging a battery of the terminal device to a second charging chip waiting to charge the battery, and controlling the first charging chip to stop charging the battery and starting the second charging chip to charge the battery if it is determined that there is the need to switch.

Also in accordance with the present disclosure, there is provided an apparatus for controlling charging of a terminal device. The apparatus includes a processor and a memory storing instructions. The instructions, when executed by the processor, cause the processor to determine whether there is a need to switch from a first charging chip currently charging a battery of the terminal device to a second charging chip waiting to charge the battery, and control the first charging chip to stop charging the battery and start the second charging chip to charge the battery if it is determined that there is the need to switch.

Also in accordance with the present disclosure, there is provided a non-transitory computer-readable storage medium storing instructions that, when executed by a processor of an apparatus for controlling charging of a terminal device, cause the apparatus to determine whether there is a need to switch from a first charging chip currently charging a battery of the terminal device to a second charging chip waiting to charge the battery, and control the first charging chip to stop charging the battery and start the second charging chip to charge the battery if it is determined that there is the need to switch.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims. Methods and apparatuses consistent with the present disclosure can be implemented in a terminal device, such as a smart phone or a tablet.

Figure 1:
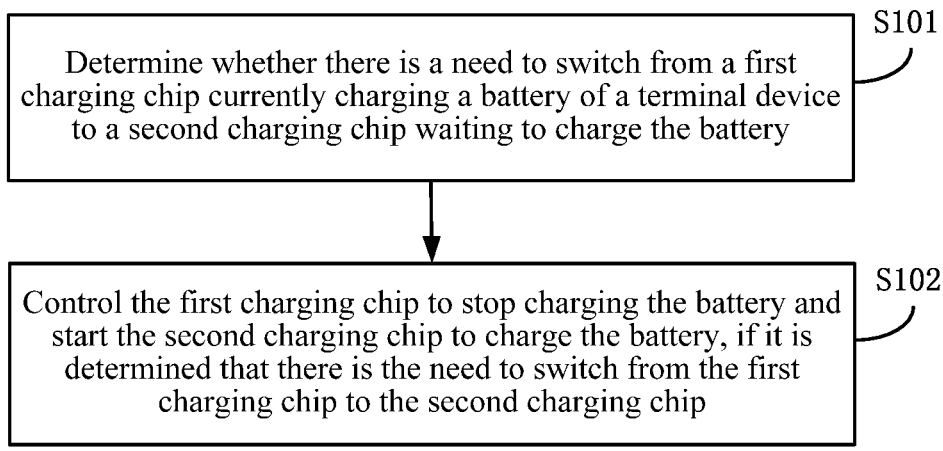
FIG. 1 is a flow chart of a method for controlling the charging of a terminal device according to an exemplary embodiment.

FIG. 1 is a flow chart of a method for controlling the charging of a terminal device, according to an exemplary embodiment. As shown in FIG. 1, at S101, when a battery of the terminal device is being charged, it is determined whether there is a need to switch the charging chip from a first charging chip that is currently charging the battery to a second charging chip that is waiting to charge the battery. In this disclosure, a charging chip that is currently charging the battery is also referred to as an "active charging chip" and a charging chip that is waiting to charge the battery is also referred to as a "standby charging chip." In some embodiments, the determination can be made by monitoring whether a charging time of the first charging chip reaches a preset charging time period, i.e., whether the charging time equals or is longer than the preset charging time period. In other embodiments, the determination can be made by monitoring whether a current temperature of the first charging chip reaches a preset temperature value, i.e., whether the current temperature equals or is higher than the preset temperature value.

At S102, if it is determined that there is the need to switch from the first charging chip to the second charging chip, the first charging chip is controlled to stop charging the battery, and the second charging chip is started to charge the battery.

For example, the terminal device includes at least two charging chips, i.e., the first charging chip that is currently the active charging chip and at least one standby charging chip. The second charging chip can be chosen from the at least one standby charging chip according to setting conditions. For example, a standby charging chip having the lowest temperature among the at least one standby charging chip is selected as the second charging chip. Alternatively, a standby charging chip having the longest standby time among the at least one standby charging chip can be selected as the second charging chip. For example, the terminal device includes a standby charging chip A, a standby charging chip B, and a standby charging chip C. If, among these standby charging chips, the standby charging chip C has the lowest temperature, then the standby charging chip C is chosen as the second charging chip. Alternatively, if the standby charging chip A, the standby charging chip B, and the standby charging chip C have been successively used to charge the battery before the first charging chip charges the battery, since the standby charging chip A has the longest standby time, the standby charging chip A is chosen as the second charging chip.

In some embodiments, determining whether to switch the charging chip (S101 in FIG. 1) includes determining a charging time of the first charging chip and, if the charging time reaches a preset time period, determining that there is the need to switch from the first charging chip to the second charging chip.

In some embodiments, the method for controlling the charging of the terminal device further includes, if it is determined that the charging time has not reached the preset time period, i.e., the charging time is shorter than the preset time period, determining a temperature of the first charging chip, and.

if the temperature of the first charging chip reaches a preset temperature value, determining that there is the need to switch from the first charging chip to the second charging chip, controlling the first charging chip to stop charging the battery, and starting the second charging chip to charge the battery.

In other embodiments, determining whether to switch the charging chip (S101 in FIG. 1) includes determining a temperature of the first charging chip and, if the temperature of the first charging chip is higher than a preset temperature value, determining that there is the need to switch from the first charging chip to the second charging chip.

In some embodiments, the method for controlling the charging of the terminal device further includes determining a current temperature of each of the at least one standby charging chip, determining the lowest temperature from the determined at least one current temperature, and, if the lowest temperature is lower than the preset temperature value, choosing a standby charging chip corresponding to the lowest temperature as the second charging chip.

In some embodiments, the method for controlling the charging of the terminal device further includes, if the lowest temperature determined from the at least one current temperature of the at least one standby charging chip is higher than the preset temperature value, reducing a charging current of the first charging chip.

Figure 2:
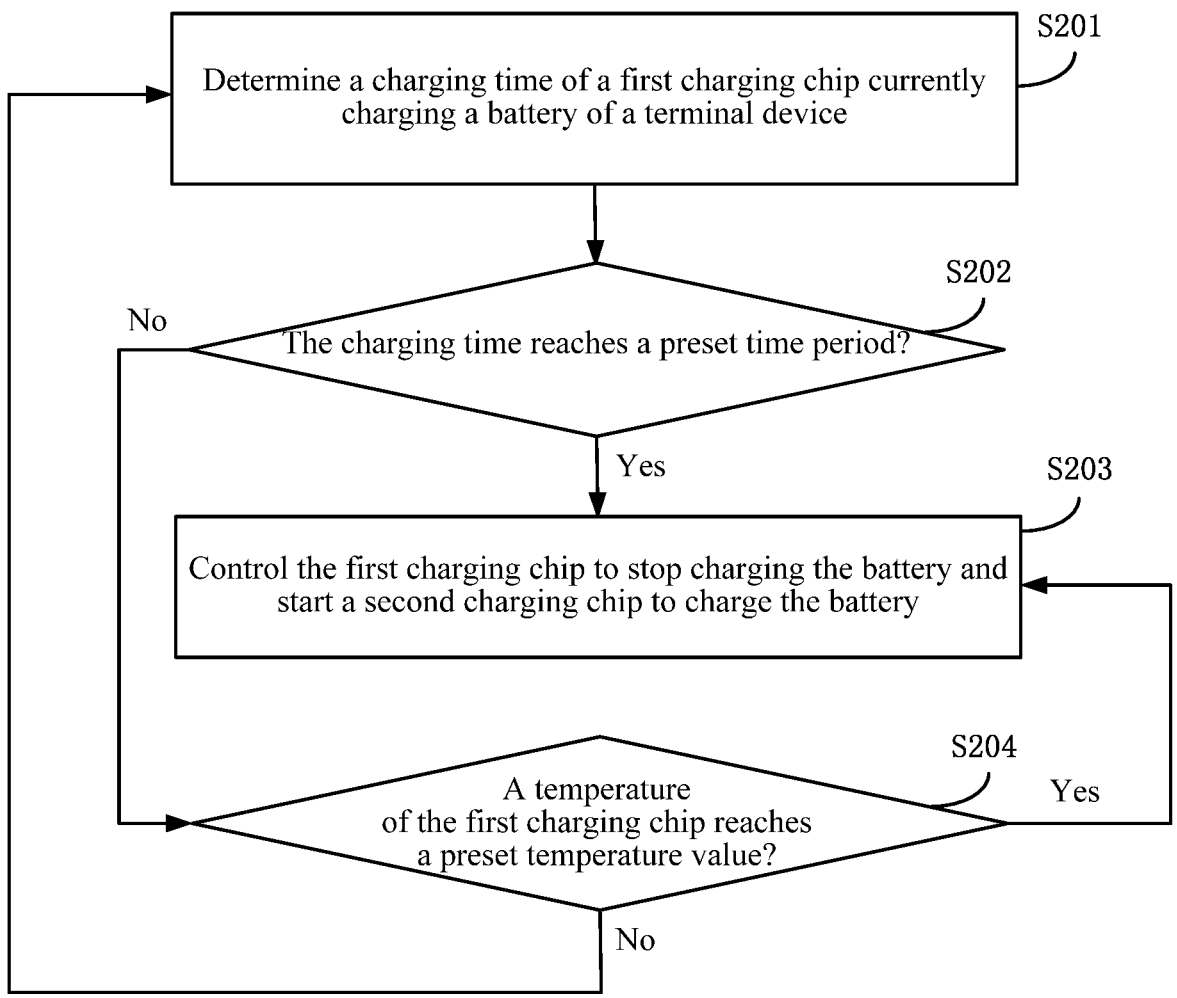
FIG. 2 is a flow chart of a method for controlling the charging of a terminal device according to another exemplary embodiment.

FIG. 2 is a flow chart of a method for controlling the charging of a terminal device, according to another exemplary embodiment. As shown in FIG. 2, at S201, when a battery of the terminal device is being charged, a charging time of a first charging chip currently charging the battery is determined. In some embodiment, the charging time of the first charging chip can be determined by a timer.

At 202, it is determined whether the charging time reaches a preset time period. If it is determined that the charging time reaches the preset time period (S202: Yes), the process proceeds to S203. On the other hand, if it is determined that the charging time has not reached the preset time period (S202: No), the process proceeds to S204. For example, the preset time period is one minute. When the charging time of the first charging chip reaches one minute, it is determined that the switching from the first charging chip to the second charging chip can be performed, and the second charging chip starts to charge the battery. After the switching, the first charging chip becomes a standby charging chip and the second charging chip becomes the active charging chip. Consequently, when the charging time of the second charging chip reaches the preset time period, the charging chip may be switched to another charging chip waiting to charge the battery, i.e., another standby charging chip. Thus, the charging of the battery is not interrupted.

Referring to FIG. 2, at S203, the first charging chip is controlled to stop charging the battery, and the second charging chip is started to charge the battery.

At S204, it is determined whether a temperature of the first charging chip reaches a preset temperature value. If it is determined that the temperature of the first charging chip reaches the preset temperature value (S204: Yes), the process proceeds to S203. On the other hand, if it is determined that the temperature of the first charging chip has not reached the preset temperature value (S204: No), i.e., the temperature of the first charging chip is lower than the preset temperature value, the process returns to S201.

In some embodiments, the temperature of the first charging chip can be determined by a temperature sensor installed on the first charging chip. In some circumstances, the temperature of the first charging chip may increase quickly due to various reasons, such as material aging. Thus, even if the charging time of the first charging chip has not reached the preset time period, the first charging chip may still generate a large amount of heat. By monitoring the temperature of the first charging chip, the first charging chip can be stopped from charging the battery before an excessive amount of heat is generated, thus reducing the amount of heat generated by the first charging chip.

Figure 3:
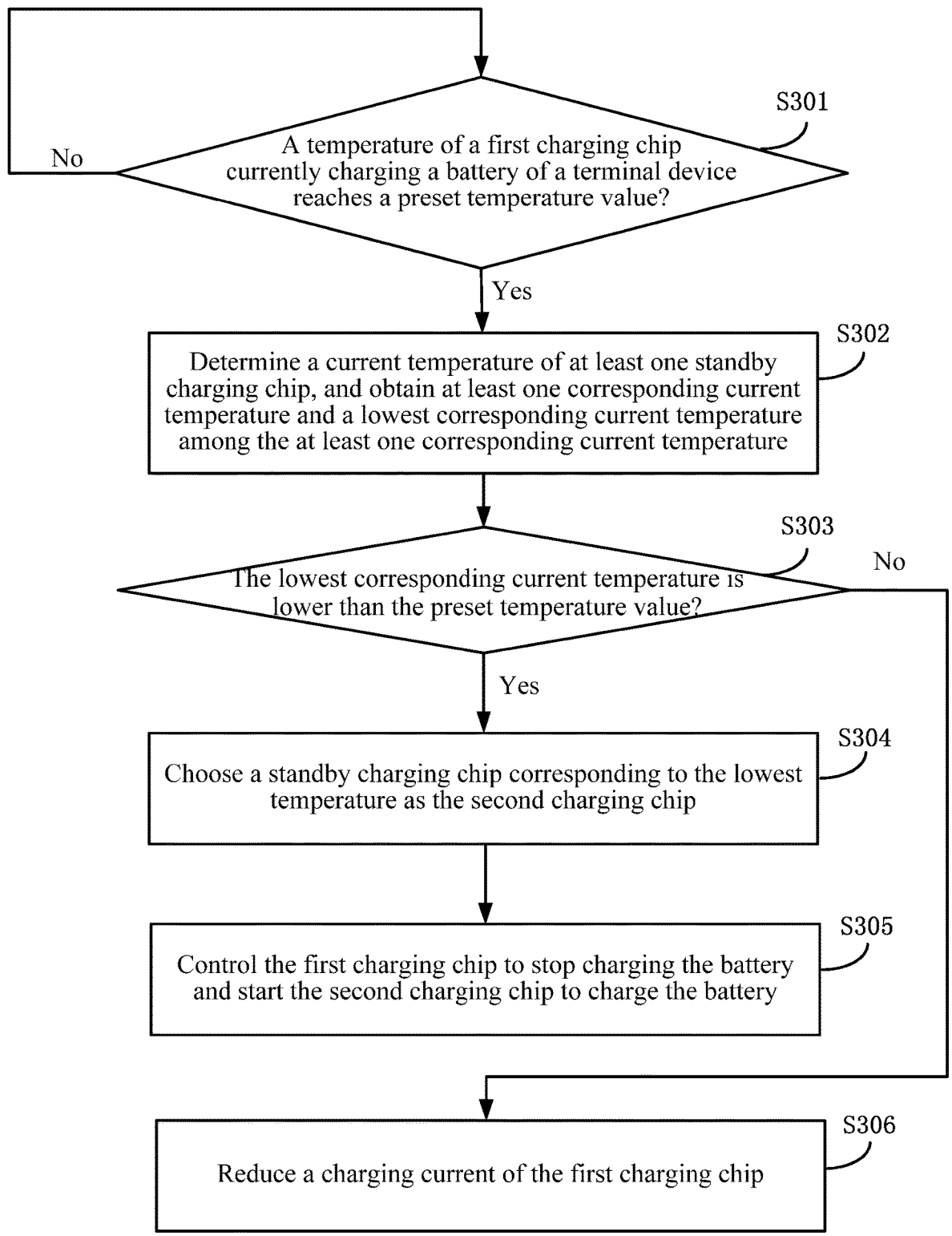
FIG. 3 is a flow chart of a method for controlling the charging of a terminal device according to another exemplary embodiment.

FIG. 3 is a flow chart of a method for controlling the charging of a terminal device, according to another exemplary embodiment. As shown in FIG. 3, at S301, when a battery of the terminal device is being charged, it is determined whether a temperature of the first charging chip currently charging the battery reaches a preset temperature value. If it is determined that the temperature of the first charging chip reaches the preset temperature value (S301: Yes), the process proceeds to S302. On the other hand, if it is determined that the temperature of the first charging chip has not reached the preset temperature value (S301: No), the process keeps checking the temperature of the first charging chip, i.e., S301 is repeated. In some embodiments, the temperature of the first charging chip can be determined by a temperature sensor installed on the first charging chip.

At S302, a current temperature of each of at least one standby charging chip waiting to charge the battery is determined, and at least one corresponding current temperature is obtained. A lowest corresponding current temperature is determined from the at least one corresponding current temperature. For example, three standby charging chips, i.e., a standby charging chip A, a standby charging chip B, and a standby charging chip C, are used.

At S303, it is determined whether the lowest corresponding current temperature is lower than the preset temperature value. If the lowest corresponding current temperature is lower than the preset temperature value (S303: Yes), the process proceeds to S304. On the other hand, if the lowest corresponding current temperature is not lower than the preset temperature value (S303: No), the process proceeds to S306.

At S304, a standby charging chip corresponding to the lowest corresponding current temperature is chosen as the second charging chip. For example, three standby charging chips, i.e., the standby charging chip A, the standby charging chip B, and the standby charging chip C, are provided. Respective corresponding current temperatures can be acquired by temperature sensors installed on the standby charging chip A, the standby charging chip B, and the standby charging chip C. In the present example, it is assumed that the current temperature of the standby charging chip A is 30° C., the current temperature of the standby charging chip B is 35° C., the current temperature of the standby charging chip C is 50° C., and the preset temperature value is 40° C. In this case, the standby charging chip having the lowest corresponding current temperature is the standby charging chip A, and the lowest corresponding current temperature is lower than the preset temperature value. Therefore, the standby charging chip A is chosen as the second charging chip.

At S305, the first charging chip is controlled to stop charging the battery, and the second charging chip is started to charge the battery.

At S306, the charging current provided by the first charging chip is reduced.

For example, it is assumed that the current temperature of the standby charging chip A is 45° C., the current temperature of the charging chip B is 48° C., the current temperature of the standby charging chip C is 50° C., and the preset temperature value is 40° C. In this case, since all of the temperatures of the standby charging chip A, the standby charging chip B, and the standby charging chip C are higher than the preset temperature value, in order to ensure the safety of charging the battery, the charging chip is not switched, and the charging current of the first charging chip is reduced.

Figure 4:
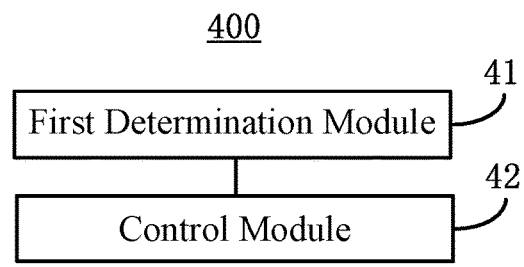
FIG. 4 is a block diagram of an apparatus for controlling the charging of a terminal device according to an exemplary embodiment.

FIG. 4 is a block diagram of an apparatus 400 for controlling the charging of a terminal device, according to an exemplary embodiment. As shown in FIG. 4, the apparatus 400 includes a first determination module 41 and a control module 42. The first determination module 41 is configured to, when a battery of the terminal device is being charged, determine whether there is a need to switch the charging chip from a first charging chip currently charging the battery to a second charging chip waiting to charge the battery. The control module 42 is configured to, if the first determination module 41 determines that the charging chip needs to be switched, control the first charging chip to stop charging the battery, and start the second charging chip to charge the battery.

Figure 5:
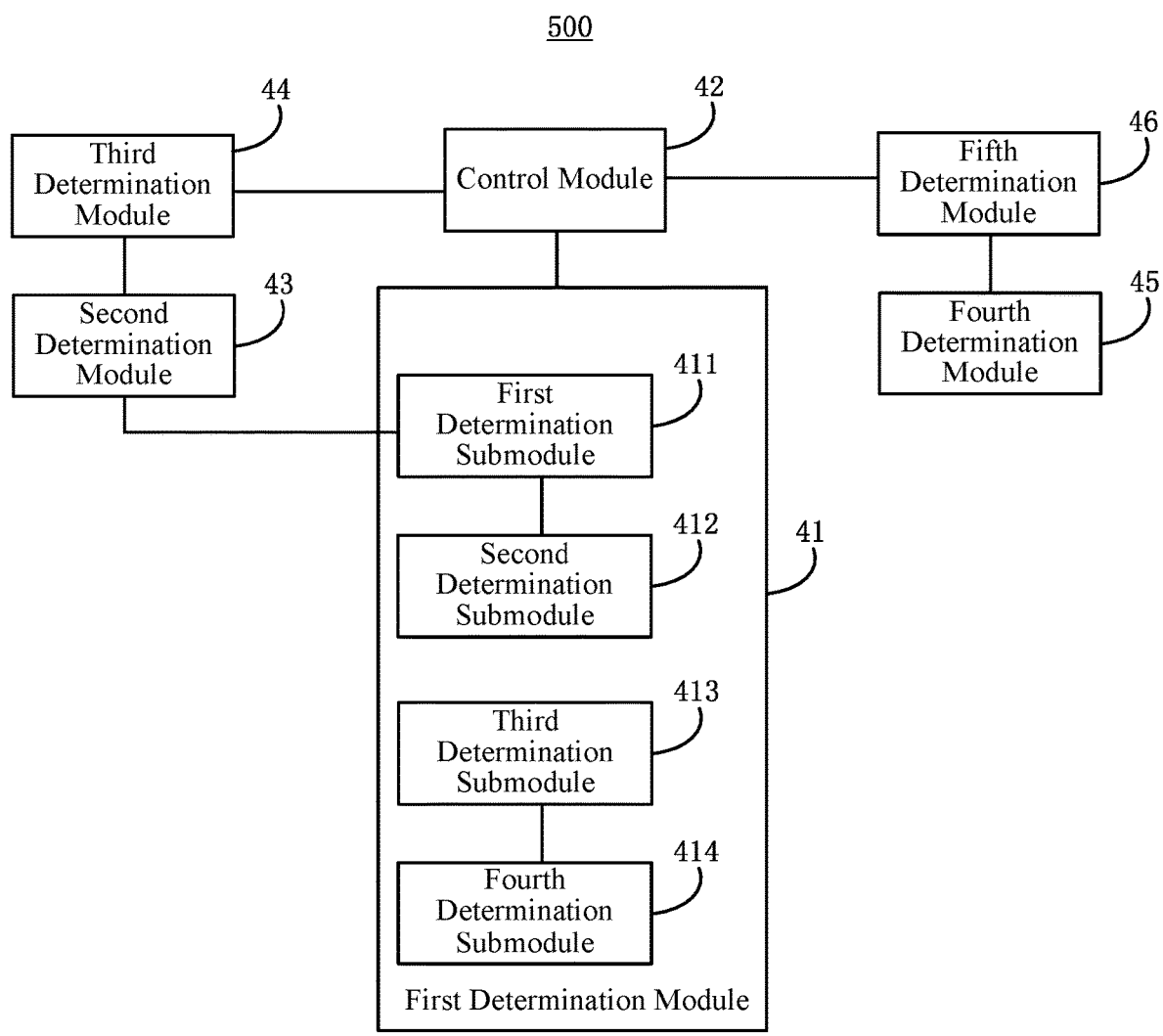
FIG. 5 is a block diagram of an apparatus for controlling the charging of a terminal device according to another exemplary embodiment.

FIG. 5 is a block diagram of an apparatus 500 for controlling the charging of a terminal device according to another exemplary embodiment. The apparatus 500 includes the first determination module 41 and the control module 42. As shown in FIG. 5, the first determination module 41 includes a first determination submodule 411 configured to determine a first charging time of the first charging chip and a second determination submodule 412 configured to, when the first determination submodule 411 determines that the first charging time reaches a preset time period, determine that there is the need to switch from the first charging chip to the second charging chip.

The apparatus 500 further includes a second determination module 43 and a third determination module 44. The second determination module 43 is configured to, if the first determination submodule 411 determines that the first charging time has not reached the preset time period, determine a temperature of the first charging chip. The third determination module 44 is configured to, if the second determination module 43 determines that the temperature of the first charging chip reaches a preset temperature value, determine that there is the need to switch from the first charging chip to the second charging chip. In this case, the control module 42 controls the first charging chip to stop charging the battery and starts the second charging chip to charge the battery.

In some embodiments, as shown in FIG. 5, the first determination module 41 further include a third determination submodule 413 configured to determine a temperature of the first charging chip and a fourth determination submodule 414 configured to, when the third determination submodule 413 determines that the temperature of the first charging chip is higher than a preset temperature value, determine that there is the need to switch from the first charging chip to the second charging chip.

As shown in FIG. 5, the apparatus 500 further includes a fourth determination module 45 and a fifth determination module 46. The fourth determination module 45 is configured to determine a current temperature of at least one standby charging chip and obtain at least one corresponding current temperature. The fifth determination module 46 is configured to determine the lowest temperature from among the at least one current temperature determined by the fourth determination module 45 and, when the lowest temperature is lower than the preset temperature value, choose a standby charging chip corresponding to the lowest temperature as the second charging chip.

In some embodiments, the control module 42 is further configured to, if the lowest temperature is higher than the preset temperature value, reduce the charging current of the first charging chip.

The specific manners of operations of individual modules or submodules in the above-described exemplary apparatuses are similar to the exemplary methods described above, and thus detailed description thereof is omitted here.

Figure 6:
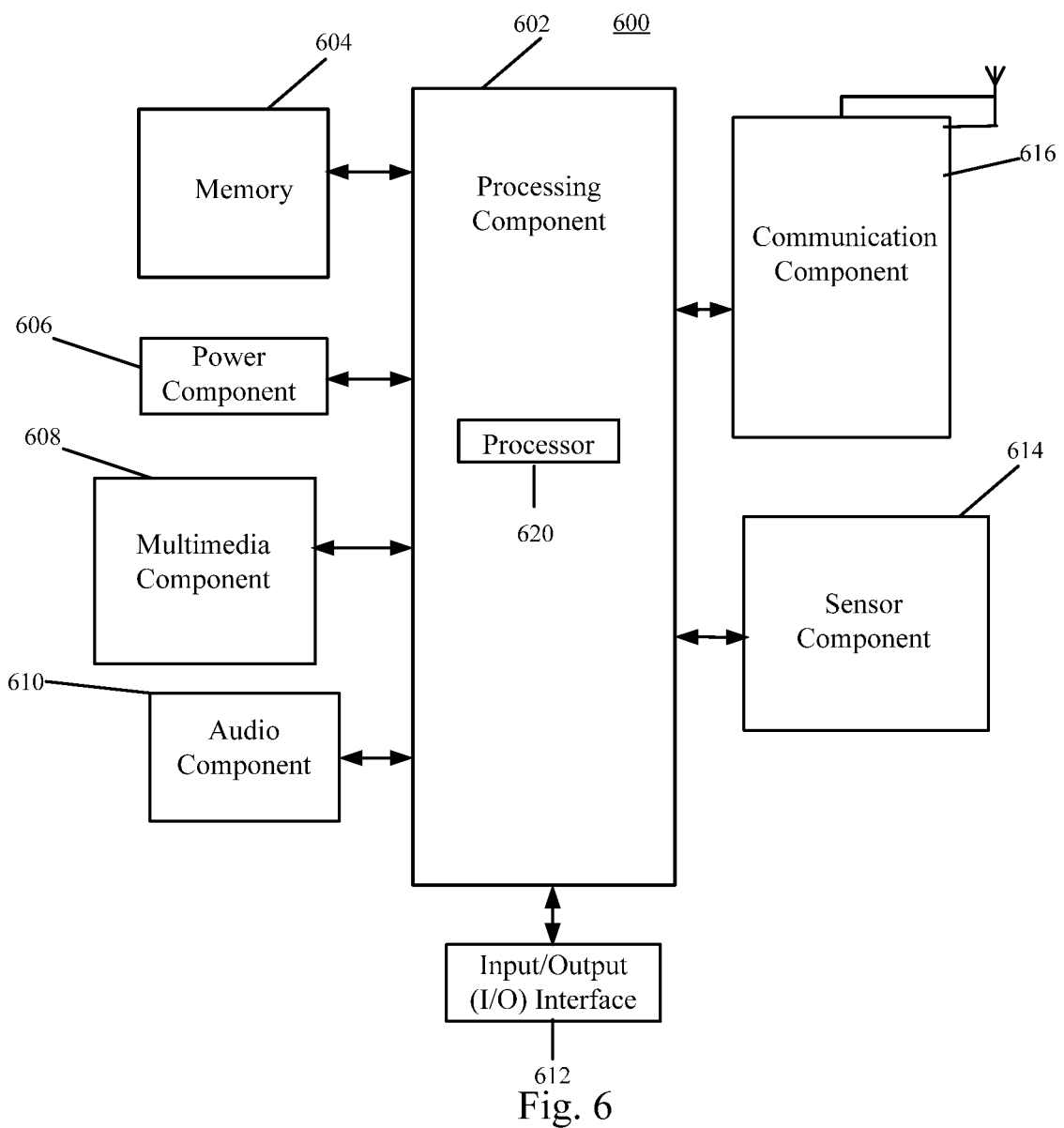
FIG. 6 is a block diagram of an apparatus for controlling the charging of a terminal device according to another exemplary embodiment.

FIG. 6 is a block diagram of an apparatus 600 for controlling the charging of a terminal device according to another exemplary embodiment. For example, the device 600 may be a mobile phone, a computer, a digital broadcast terminal, a messaging device, a gaming console, a tablet, a medical device, exercise equipment, a personal digital assistant, or the like.

Referring to FIG. 6, the device 600 includes one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive an external multimedia datum while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone configured to receive an external audio signal when the device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, or the like. The buttons may include, but are not limited to, a home button, a volume button, a starting button, and a locking button.

The sensor component 614 includes one or more sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the device 600 and other devices. The device 600 can access a wireless network based on a communication standard, such as WiFi, 3G or 4G or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth technology, and other technologies.

In exemplary embodiments, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 604, executable by the processor 620 in the device 600, for performing the above-described methods. For example, the non-transitory computer-readable storage medium may be a ROM, a RAM, a CD-ROM, a magnetic tape, a floppy disc, an optical data storage device, and the like.

According to the present disclosure, a first charging chip that is currently charging a battery of a terminal is stopped to charge the battery before the first charging chip generates excessive heat. Thus, the heat generated by the first charging chip is maintained at a relatively low level. Further, since a second charging chip that is waiting to charge the battery has a relatively low temperature, when the second charging chip is connected to charge the battery, the second charging chip can perform the charging with a relatively large current, thus increasing the charging efficiency.

Other embodiments of the disclosure will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for controlling charging of a terminal device, comprising:
   determining whether there is a need to switch from a first charging chip currently charging a battery of the terminal device to a second charging chip waiting to charge the battery, wherein the determining comprises:
      determining a temperature of the first charging chip;
      determining, when the temperature of the first charging chip reaches a preset temperature, that there is the need to switch;
      determining a temperature of at least one standby charging chip waiting to charge the battery;
      determining a lowest temperature from the temperature of the at least one standby charging chip; and
      choosing, if the lowest temperature is lower than the preset temperature, one of the at least one standby charging chip as the second charging chip, the second charging chip having a longest standby time after being used to charge the battery among the at least one standby charging chip;
   controlling the first charging chip to stop charging the battery and starting the second charging chip to charge the battery if it is determined that there is the need to switch; and
   reducing, if the lowest temperature is higher than the preset temperature, a charging current of the first charging chip.

2. An apparatus for controlling charging of a terminal device, comprising:
   a processor; and
   a memory storing instructions that, when executed by the processor, cause the processor to:
      determine whether there is a need to switch from a first charging chip currently charging a battery of the terminal device to a second charging chip waiting to charge the battery, wherein, in determining whether there is the need, the instructions further cause the processor to:
         determine a temperature of the first charging chip;
         determine, when the temperature of the first charging chip reaches a preset temperature, that there is the need to switch;
         determine a temperature of at least one standby charging chip waiting to charge the battery;
         determine a lowest temperature from the temperature of the at least one standby charging chip; and
         choose, if the lowest temperature is lower than the preset temperature, one of the at least one standby charging chip as the second charging chip, the second charging chip having a longest standby time after being used to charge the battery among the at least one standby charging chip;
      control the first charging chip to stop charging the battery and start the second charging chip to charge the battery if it is determined that there is the need to switch; and
      reduce, if the lowest temperature is higher than the preset temperature, a charging current of the first charging chip.

3. A non-transitory computer-readable storage medium storing instructions that, when executed by a processor of an apparatus for controlling charging of a terminal device, cause the apparatus to:
   determine whether there is a need to switch from a first charging chip currently charging a battery of the terminal device to a second charging chip waiting to charge the battery, wherein, in determining whether there is the need, the instructions further cause the apparatus to:
      determine a temperature of the first charging chip;
      determine, when the temperature of the first charging chip reaches a preset temperature, that there is the need to switch;
      determine a temperature of at least one standby charging chip waiting to charge the battery;
      determine a lowest temperature from the temperature of the at least one standby charging chip; and
      choose, if the lowest temperature is lower than the preset temperature, one of the at least one standby charging chip as the second charging chip, the second charging chip having a longest standby time after being used to charge the battery among the at least one standby charging chip;
   control the first charging chip to stop charging the battery and start the second charging chip to charge the battery if it is determined that there is the need to switch; and
   reduce, if the lowest temperature is higher than the preset temperature, a charging current of the first charging chip.

* * * * *